Oct. 17, 1939.　　　H. F. FLOWERS　　　2,176,171
DRIVING MECHANISM FOR VEHICLES
Filed July 20, 1936　　　7 Sheets-Sheet 1

Inventor:
Henry F. Flowers,
by Mason & Porter
Att'ys.

Oct. 17, 1939. H. F. FLOWERS 2,176,171
DRIVING MECHANISM FOR VEHICLES
Filed July 20, 1936 7 Sheets-Sheet 5

Inventor:
Henry F. Flowers,
by Mason + Porter
Att'ys.

Oct. 17, 1939.  H. F. FLOWERS  2,176,171

DRIVING MECHANISM FOR VEHICLES

Filed July 20, 1936  7 Sheets-Sheet 6

Inventor:
Henry F. Flowers,
by Mason & Porter
Att'ys.

Patented Oct. 17, 1939

2,176,171

UNITED STATES PATENT OFFICE 2,176,171

DRIVING MECHANISM FOR VEHICLES

Henry Fort Flowers, Findlay, Ohio

Application July 20, 1936, Serial No. 91,590

15 Claims. (Cl. 180—24)

The invention relates to new and useful improvements in a vehicle having opposed trucks or bogies, each of which carries two or more wheels, and wherein the trucks or bogies are mounted so as to turn independently about vertical axes and also about horizontal axes.

An object of the invention is to provide a driving mechanism for the vehicle which includes a motor associated with each bogie and driving means operated by the motor for actuating the wheels of he bogie with which said motor is associated.

A further object of the invention is to provide a bogie pivoted intermediate its ends and having wheels in tandem driven at the same speed with means for transmitting the reaction of the driving torque tending to turn the bogie, to the frame so that the pressure of the wheels on the ground are substantially equal.

A still further object of the invention is to provide a mounting, a driving means and a braking means for the wheels of each bogie which is so constructed that the rolling radii of the wheel treads, when of rubber, remain the same regardless of whether power is being applied to the wheels, the wheels are idling, or the brakes are set for retarding the vehicle.

These and other objects will in part be obvious and will in part be hereinafter more fully disclosed.

In the drawings which show by way of illustration one embodiment of the invention—

In my co-pending application Serial No. 721,234, filed April 18, 1934, now Patent No. 2,110,213, dated March 8, 1938, there is shown and described a vehicle having trucks or bogies at the opposite sides thereof on which the body is independently mounted so that each bogie may turn about a horizontal axis, also turn about a vertical axis and have a vertical movement relative to the body. There is a driving means connected to the wheels at the opposite ends of the bogies for rotating the wheels at the same speed. The present invention has to do with an improvement in the mounting means for the wheels whereby the driving shafts associated with each wheel may be maintained in substantially a horizontal position and the torque load incident to the driving of the wheels and the braking of the same transmitted to the frame of the vehicle. To this end, the bogie frame at each end thereof is constructed so as to receive and support an auxiliary frame unit in which the spindle carrying the wheel is mounted and also in which the shaft for rotating the wheel spindle is mounted. A link connects each auxliary frame unit with a supporting sleeve mounted on the king post so that for all positions of vertical oscillations of the bogie frame, the auxiliary frame unit remains substantially in the same vertical line and the shaft section carried thereby for turning the wheel spindle is maintained horizontal or parallel to the body frame.

It is thought that the driving mechanism for the wheels of the bogies and the mounting of the wheels on the bogies so as to obtain equal pressure of the wheels on the ground will be better understood by a detail description of the present illustrated embodiment of the invention. The vehicle to which the invention is applied includes a center beam 1 having cross frames or bolsters 2, 2 rigidly secured thereto. At each end of the bolster is a depending king post 3 which is rigidly attached to the bolster and forms a part thereof.

The bolster also carries a bracket 4 at each end thereof on which the body is mounted. There are two opposed king posts at the forward end of the vehicle and two opposed king posts adjacent the rear end of the vehicle. Associated with each king post is a truck or bogie carrying two or more wheels. The bogies and the wheels carried thereby are all similar in construction and the description of one will answer for the others. Each bogie includes a bogie frame 5. The bogie frame 5 is a hollow frame structure which is shaped so as to provide a central bearing sleeve 6 adapted to receive a gimbal supporting member 7 formed integral with a sleeve 8 which is adapted to receive the king post 3. The sleeve 6 is provided with bushings 9, 9 which contact with the gimbal support 7, and this permits the bogie frame to turn on its gimbal support 7 about a horizontal axis centrally thereof.

At each end of the bogie frame 5 there is a supporting sleeve 10 which projects outwardly from the bogie frame. An auxiliary frame unit for each wheel is mounted in this sleeve 10. The auxiliary frame unit is in the form of a bearing sleeve 11 which extends into and through the supporting sleeve 10. There are bushings 12, 12 between this bearing sleeve 11 and the supporting sleeve 10. A cap 13 is threaded on to the outer end of the bearing sleeve 11 and holds the same in the supporting sleeve so that it may turn freely therein. Mounted for rotation in this auxiliary frame unit 11 is a wheel spindle 14. A roller bearing 15 is disposed between the wheel spindle and the sleeve 11. Said spindle is provided with a shoulder 16 which contacts with the roller bearing 15 at the inner end thereof, and this roller bearing bears against the cap 13.

The spindle 14 has a projecting tapered portion 17 which extends beyond the cap 13. The wheel is mounted on this tapered portion. As shown in the drawings, the wheel includes a hub 18 which is secured by a key 19 to the spindle so as to turn therewith. Fixed to the hub 18 are two disks 20 and 21. The disk 20 carries a tire rim 22 and the disk 21 carries a tire rim 23. A tire 24 is attached to the rim 22 and a tire 25 is attached to the rim 23. These tires are of the usual type used in connection with road vehicles.

The hub 18 is secured to the driving spindle by means of a nut 26 and a cap 27 threaded on to the hub encloses and covers said nut. When the nut is removed, the wheel may be readily removed from the driving spindle and another wheel substituted therefor. This removal of the wheel can be accomplished without, in any way, disassembling the mounting for the wheel spindle. While two tires are shown for the one wheel hub 18, it is understood that the wheel may be greatly modified as to construction. Instead of providing two rims with two tires, one rim only may be used. Instead of providing a wheel having a rim and rubber tire, a wheel having a metal tread with a flange for operation on a track may be used.

Figure 7:
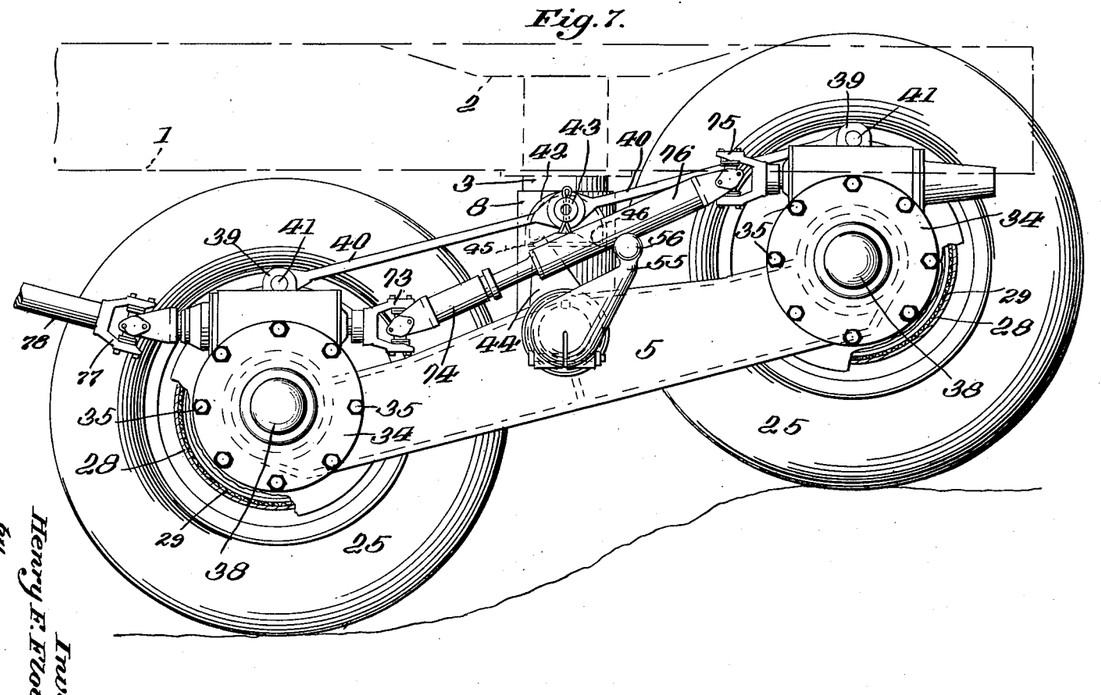
Fig. 7 is a view partly in side elevation and partly in section showing the bogie as oscillated about a horizontal axis to the limit of its movement while passing over rough terrain.
Figure 8:
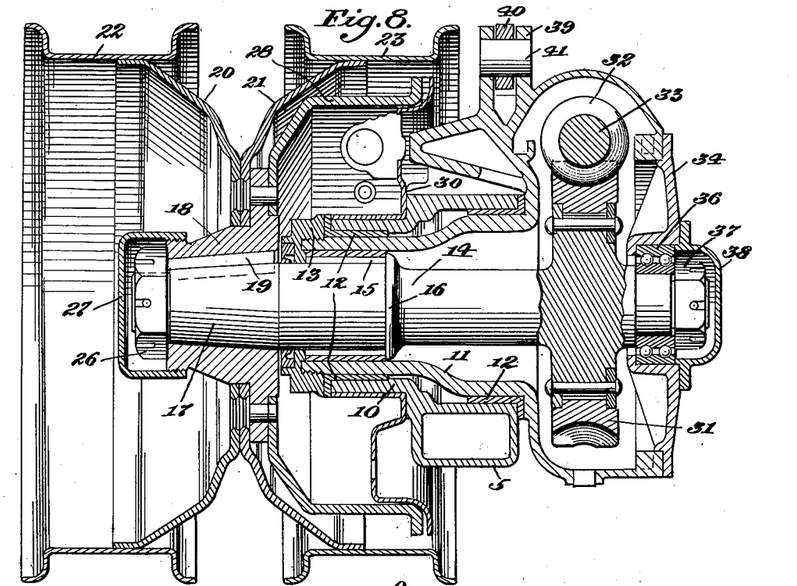
Fig. 8 is an enlarged transverse section through the bogie at one of the wheel spindles.

Attached to the hub 18 is a brake drum 28 and associated with this brake drum is a suitable braking mechanism including a brake shoe 29 (see Fig. 7). A plate 30 is attached to the sleeve 11 of the auxiliary frame unit, and the braking mechanism is mounted on this plate 30. The wheel spindle 14 is provided with a spiral gear 31 which meshes with a worm gear 32 carried by a shaft 33. The auxiliary frame unit has an opening at the inner side which is closed by a plate 34. Said plate is secured to the auxiliary frame unit by suitable bolts 35, 35. This plate 34 carries a roller bearing 36, and the outer end of the wheel spindle 14 extends through the roller bearing 36. A nut 37 secured to the outer end of the wheel spindle holds the inner bearing member of the roller bearing in place. This bearing is not only a radial bearing, but it is also a thrust bearing and holds the wheel spindle in a fixed endwise position in the auxiliary frame unit. A cap plate 38 covers the nut 37 and is attached to the plate 34.

Figure 5:
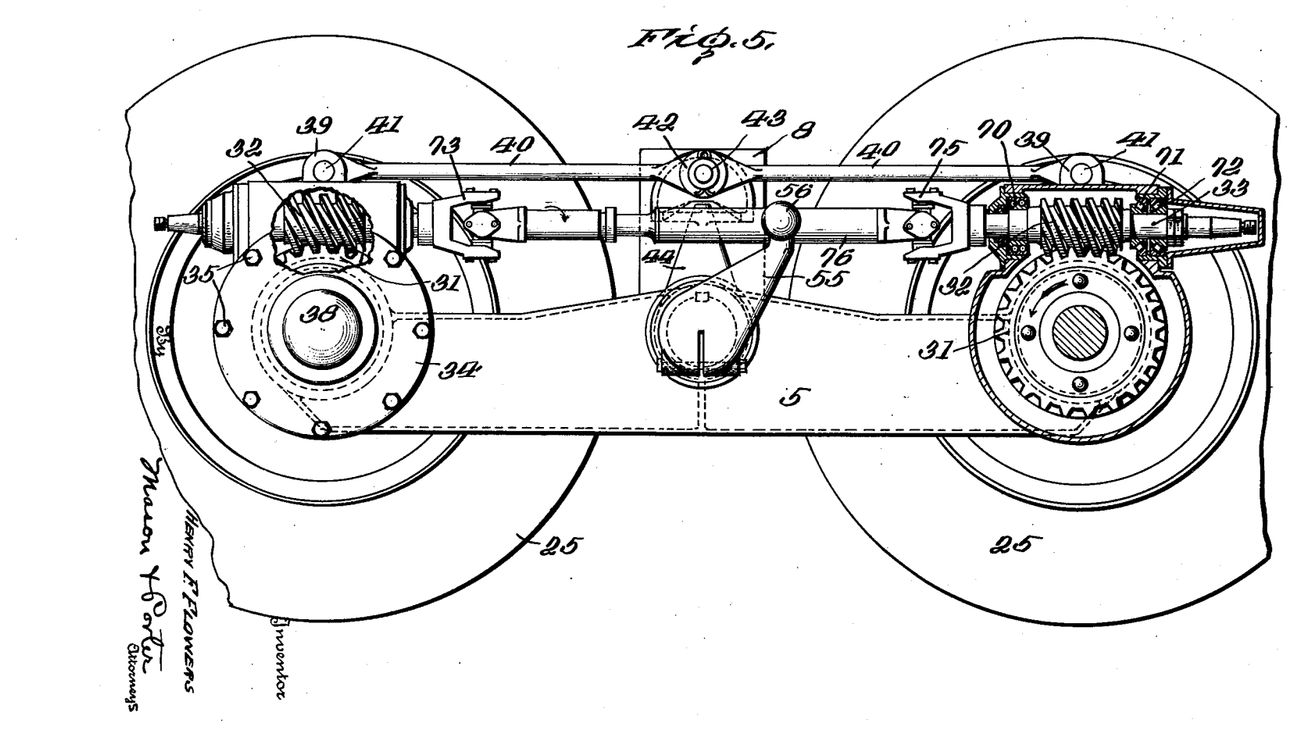
Fig. 5 is a view partly in side elevation and partly in section showing one of the bogies and the driving means connected to the wheels at the opposite ends of the bogies for rotating the same.
Figure 6:
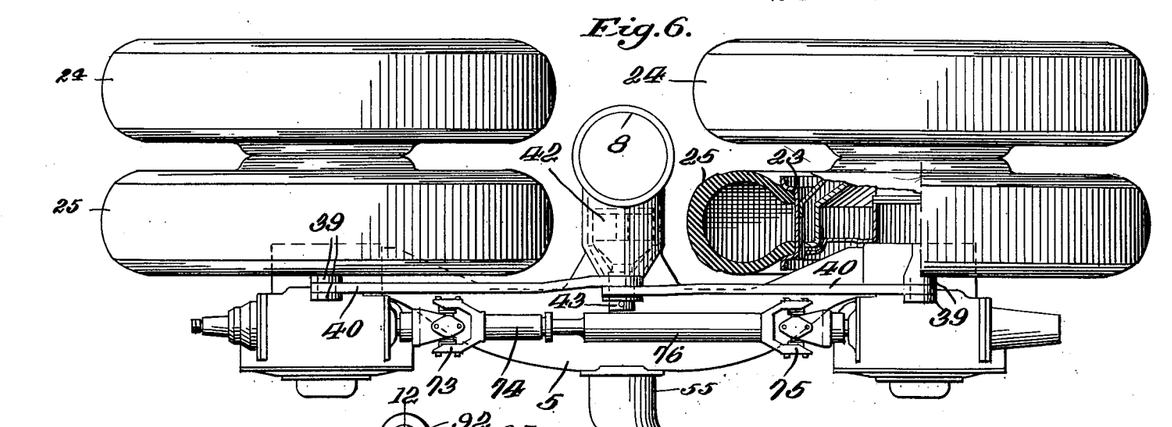
Fig. 6 is a view partly in plan and partly in section of the parts shown in Fig. 5.
Figures 9, 10:
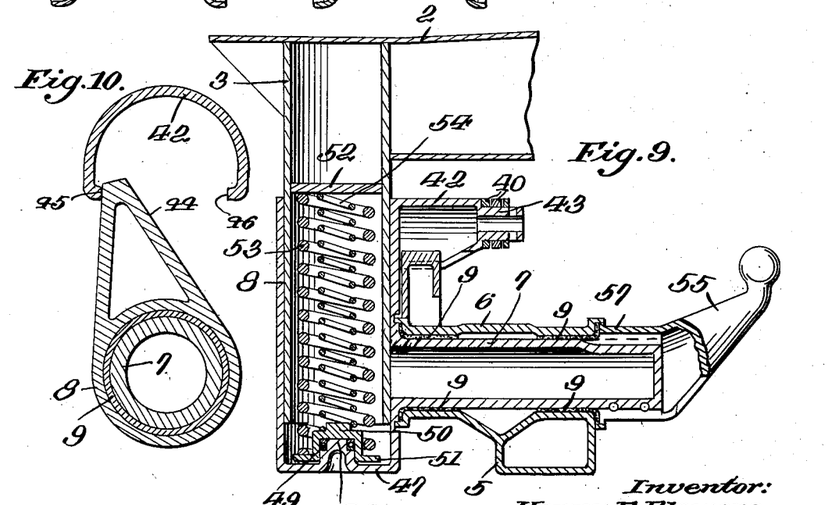
Fig. 9 is an enlarged transverse section through one of the bogies and through the king post on which it is mounted.
Fig. 10 is a detail showing the means for limiting the oscillations of the bogie so as to prevent the wheels from striking the frame of the body.

The auxiliary frame unit, the wheel spindle, and wheel at each end of the bogie are similar in construction and like reference numerals have been applied thereto. Extending upwardly from this auxiliary frame unit are spaced lugs 39, 39 between which a link 40 extends. Said link is secured to the lugs by means of a pivot bolt 41. The bogie frame 5 is mounted on the gimbal member 7 so that the bogie frame and the wheels carried thereby can oscillate in a vertical plane about a horizontal axis. The sleeve 8 carying the gimbal member 7 is provided with a forwardly projecting bracket 42. The link 40 which is attached to the auxiliary frame unit at the left, as viewed in Fig. 5, is also attached to a pivot member 43 at the outer end of the bracket 42. The link 40 which is attached to the auxiliary frame unit at the right, as viewed in Fig. 5, is also connected to this same pivot member 43. When the bogie frame shifts to the position shown in Fig. 7, due to the uneven terrain, these links 40, 40 will hold the auxiliary frame unit in a fixed vertical line. The purpose of these links will be more fully described hereinafter. When the bogie frame swings to the position shown in Fig. 7, the upstanding arm 44 formed rigid with the sleeve 6 of the bogie frame 5 will contact with the bracket 42 and thus limit the swinging movement of the bogie so as to prevent the wheels from striking the body of the vehicle. The bracket 42 has a cut-away portion at its lower side providing stops 45 and 46. The upstanding arm 44 is shown in contact with the stop 45, in Fig. 10, and also in Fig. 7. When the bogie swings about a horizontal axis in the opposite direction, then the arm 44 will contact with the stop 46.

The sleeve 8 (see Fig. 9) is closed at its lower end as indicated at 47. Said closed end has an upstanding stud 48 carrying a ball bearing 49. An abutment plate 50 is mounted on said stud and supported by this ball bearing. Said plate is provided with a flange 51. The king post 3 extends down into the sleeve 8. Said king post has an abutment partition plate 52 secured therein. A coiled spring 53 rests on the flange 51 and bears against this abutment partition plate 52. A second coiled spring 54 rests on the upper end of the abutment plate 50 and likewise bears against this abutment partition plate 52. These springs serve as a cushioning means for supporting the frame and the vehicle body which is mounted on the frame. This provides a means whereby the bogie can move vertically relative to the frame. The sleeve 8 is free to turn on the king post about a vertical axis centrally of the king post, so that each bogie is mounted whereby it is free to turn about a vertical axis centrally of the king post, about a horizontal axis intersecting the vertical axis on the king post, and also to move bodily relative to the frame in a vertical direction.

Figure 1:
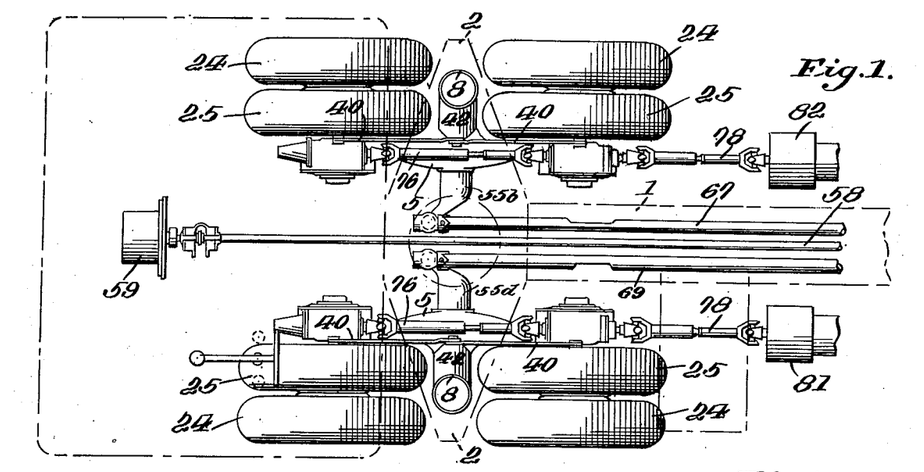
Figure 1 is a view showing more or less diagrammatically and in plan the front trucks or bogies of the vehicle and the means for driving the same.
Figures 2, 4:
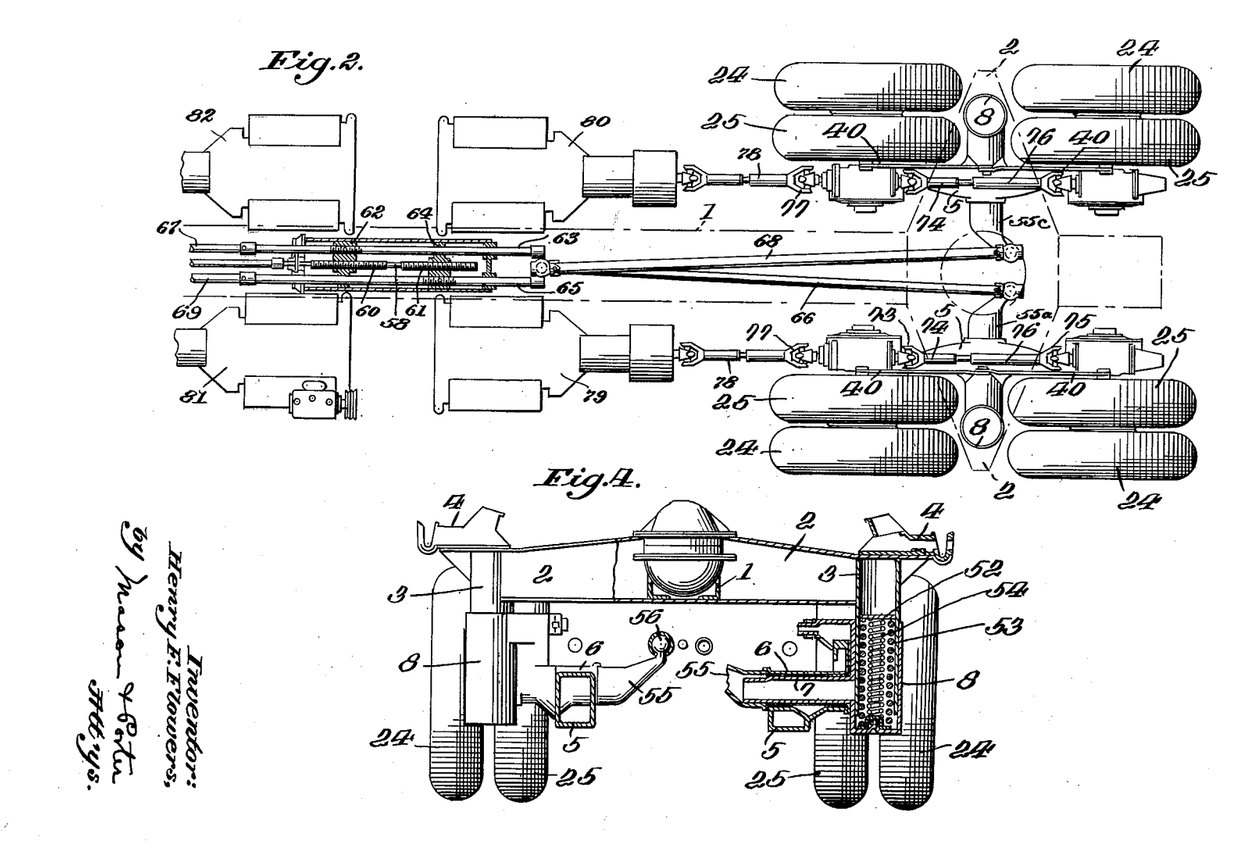
Fig. 2 is a view similar to Fig. 1, but showing the rear trucks or bogies and the motors which operate the wheels of the respective bogies.
Fig. 4 is a view partly in front end elevation and partly in section through the frame and one of the bogies, and showing the means whereby the frame is supported on the bogie.
Figure 3:
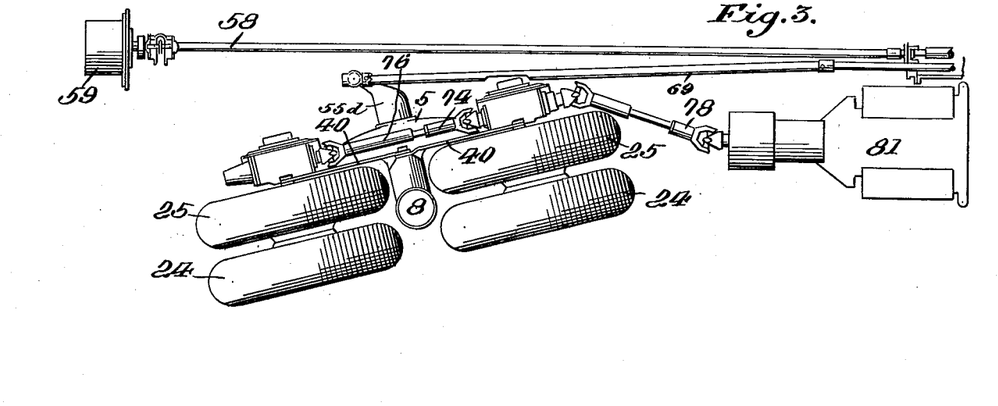
Fig. 3 is a view showing one of the bogies turned for travel in a curved path.

When the wheels are for road travel, then a steering mechanism is essential for the turning of the bogies. Fixed to the gimbal supporting member 7 is an arm 55 carrying a ball 56 at its end. The arm 55 is formed integral with a sleeve 57 which is keyed to the gimbal supporting member 7 so that it becomes a rigid extension of said gimbal supporting member 7. The arm 55 is utilized for turning the bogie about its vertical axis. The steering mechanism as illustrated in Figures 1 and 2, forms no part of the present invention per se, but is shown, described and claimed in my co-pending application Serial No. 91,589, filed of even date herewith. Briefly, said steering mechanism includes an actuating shaft 58 which is connected to a fluid-operated motor 59 so that the shaft may be rotated in one direction or the other. This shaft carries right and left-hand threaded sections 60 and 61. A steering head 62 cooperates with the threaded section 60 and is attached to a rod 63 for moving the same endwise. A steering head 64 cooperates with the threaded section 61 and is connected to a rod 65 for moving the same endwise. The rod 63 is connected by a link 66 to the arm 55a of the left-hand bogie at the rear of the vehicle. This rod 63 is connected by a link 67 to the arm 55b of the right-hand front bogie. The rod 65 is connected by a link 68 to the arm 55c of the right rear bogie and is connected by a link 69 to the arm 55d of the left front bogie. When the steering shaft is turned in one direction, then the bogies will be turned on their respective vertical axes so that the vehicle will travel in a curved path in one direction, and when the shaft is turned in the opposite direction, then the vehicle will travel in a curved path to the opposite side.

The shaft 33 at the left, in Fig. 5, is mounted for rotation in a ball bearing 70, and also in two thrust bearings 71 and 72 which prevents the shaft from endwise movements in the auxiliary frame unit. The shaft 33 carries the worm gear 32 which meshes with the spiral gear 31. The shaft 33 for the right-hand wheel spindle as viewed in Fig. 5, carries a worm gear 32 meshing with the spiral gear 31, and the shaft is mounted in a ball bearing 70 and thrust bearings 71 and 72 similar to those described above. The thrust bearings are at the opposite end of the shaft at the right-hand end of the bogie from those at the left-hand end of the bogie. The shaft 33 at the left is connected through a universal coupling 73 to a shaft section 74. The shaft 33 at the right is connected through a universal coupling 75 to a shaft section 76. The shaft section 76 has a telescoping engagement with the shaft section 74 and is splined thereto so that the shaft 33 for the wheel at the right end of the bogie is thus geared to the shaft 33 driving the wheel at the left of the bogie. The two wheels will, therefore, be turned at the same speed. The shaft 33 is connected through a universal joint 77 to a shaft 78, which shaft 78 is connected to the motor associated with the respective bogie. The shaft 78 which is connected to the rear left-hand bogie (see Fig. 2) is connected to the driving shaft of a motor 79. This motor may be of any desired construction. The shaft 78 of the right-hand rear bogie is connected to the actuating shaft of a motor 80. The shaft 78 of the left-hand front bogie is connected to the actuating shaft of a motor 81, and the shaft 78 for the right-hand front bogie is connected to the actuating shaft of a motor 82. By this arrangement, each bogie has its own operating motor. Each shaft 78 is made with telescoping sections so as to permit the bogies to turn freely about their horizontal axes, and also about their vertical axes.

When the bogie is oscillated about its horizontal axis through the wheels passing over rough terrain to the position shown in Fig. 7, the auxiliary frame units remain in a fixed vertical line through the links 40 which are connected to the sleeve at the king post. Inasmuch as the auxiliary frame units are maintained in a fixed vertical line, the shafts 33, 33 supported thereby will be maintained in a horizontal position and parallel with the frame or body of the vehicle. When the shaft 78 and the shaft sections 74 and 76 are turned in the direction of the arrow in Fig. 5, the wheels are rotated in a counter-clockwise direction, as viewed in said figure, for forward travel of the vehicle. The reaction of the torque turning the front wheel, that is, the wheel at the left, as viewed in Fig. 5, tends to turn the bogie frame in a clockwise direction about its horizontal pivotal axis and press the rear wheel against the ground. The reaction of the torque due to driving the rear wheel tends to lift the front wheel off the ground. The links 40 are for the purpose of taking this torque load and insuring that the wheels shall bear with equal pressure against the ground. Let us assume that the vehicle is equipped with rubber tires having equal air pressure and there are no links to take this torque load. Then the rear wheel will be pushed toward the ground, thus reducing its rolling radius and the distance it will travel in one revolution, while the front wheel would be lifted off the ground, increasing its rolling radius and the distance which it will travel in one revolution. Inasmuch as the two wheels are geared together, this difference in the rolling radius of said wheels will cause one to slip and wear excessively when the power is applied. However, the links 40, 40 will transmit this torque load to the king posts and on to the frame and cause the wheels to bear with equal pressure on the ground. This results in the two wheels having equal rolling radii, and no slippage and wear when power is applied.

When the brake is applied to the rear wheel, it will tend to rotate the bogie frame in the direction of travel and increase the weight on the front wheel. The application of the brake to the front wheel will tend to lift the rear wheel, and this again will cause unequal pressure, unequal rolling radii and the wear on the tires. This all occurs in case there are no links 40 to which the torque load incident to the application of the brakes can transmit the same to the frame. Without the links, both the driving torque and the braking torque are transmitted to the bogie frame, tending to turn it about a horizontal axis. With the auxiliary frame units and the link connections to the frame of the vehicle, the driving torque and the braking torque are removed entirely from the bogie frame and transmitted to the main frame carrying the body of the vehicle.

By the arrangement above described, the pressure of the tires against the ground will be substantially equal, whether the wheels are being driven, when they are running idle, or whether the brake is applied thereto. This permits the wheels at the opposite ends of the bogies to be directly geared together and driven from the same motor without undue wear on the tires.

Figure 11:
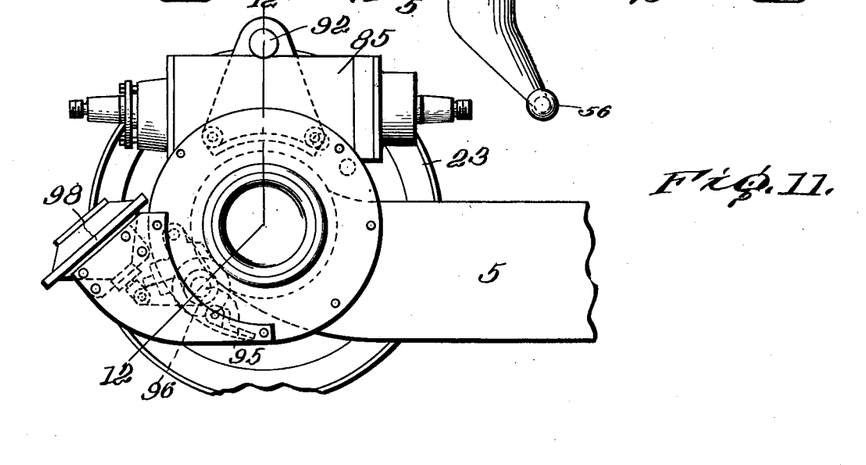
Fig. 11 is a view showing one end of the bogie frame and a modified form of supporting means for the wheel.
Figure 12:
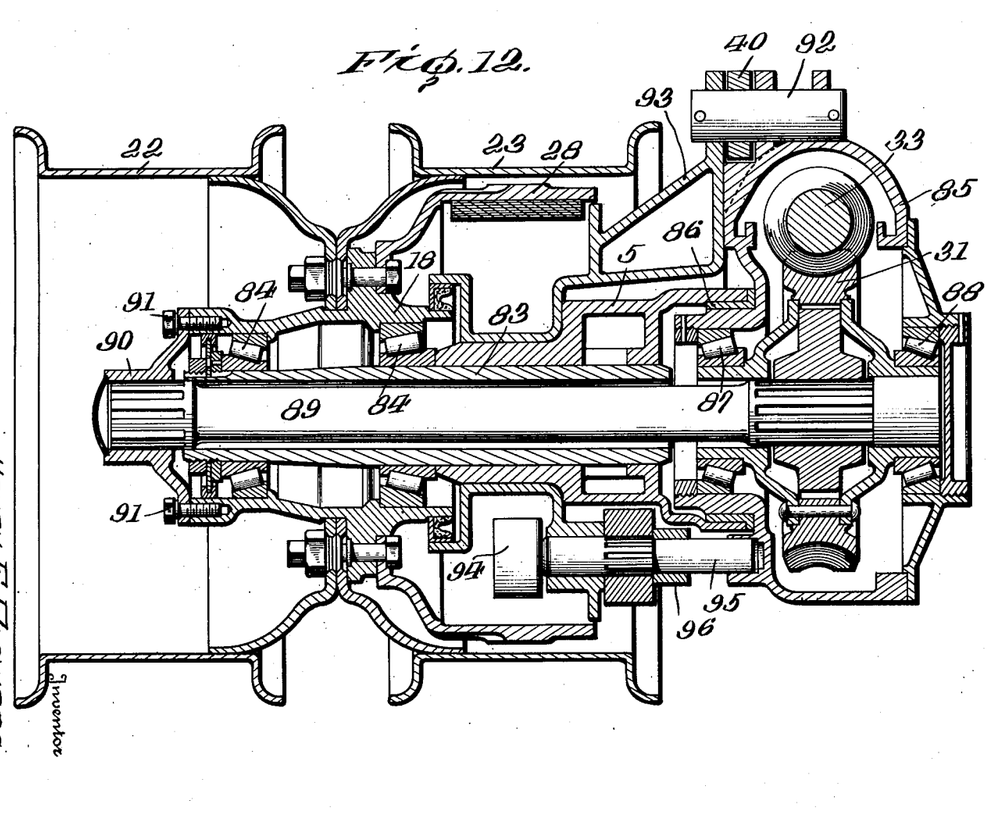
Fig. 12 is a sectional view of the line 12, 12 of Fig. 11.

In Figures 11 and 12 of the drawings there is shown a slightly different form of wheel support which will be briefly described. The bogie frame 5 and the manner of supporting the body is the same as described above in detail. Pressed into the end of the bogie frame is a high tensile strength steel tubing 83. The wheel hub 18 is mounted for rotation in bearings 84, 84 carried by this tubing. It will be noted that these bearings are centrally disposed relative to the two tires, and therefore, the load is distributed evenly on the two bearings in proportion to the carrying capacity of the bearings. A gear housing 85 is pivotally mounted at the inner side of the bogie frame. There is a bearing sleeve 86 between the gear housing and the bogie frame. Within this gear housing is the driving shaft 33 which drives the gear wheel 31 in the manner described above. This gear wheel 31 is mounted in bearings 87 and 88 in the gear housing. Power is transmitted from the gear 31 to the wheel through a spindle 89 which has a splined connection with the gear wheel and a splined connection with a member 90 bolted to the hub by bolts 91 and forming a part of the hub. The tubular member 83 which carries the wheel does not rotate, and therefore, there is no continual reversal or stresses which causes the spindle to break. The driving is accomplished through this torsion tube or spindle 89 which has splined connections with the gear wheel and the hub, so that the torsion shaft or spindle 89 floats in the bogie frame spindle 83 and serves to transmit torque only.

As noted above, the gear housing is pivotally mounted on the inner side of the bogie frame. It is held in this bearing on the frame by a pin connection 92 with the brake spider 93. The brake spider is pivotally mounted on the end of the bogie 5, so that the re-action of the brake shoe against the spider when the brakes are applied is transmitted to this pin connection 92. The link 40 is connected to the pin 92, and therefore, the braking torque is transferred to the links 40 in the manner described above. That is to say, the reaction from the braking mechanism is transferred to the frame. The braking mechanism is of the usual type for heavy duty trucks, and a detail description thereof is not thought necessary. It is sufficient to state that there are braking levers carrying brake shoes which cooperate with the brake drum 28, and these braking levers are separated by a cam 94 carried by a shaft 95 which is operated by a lever 96 connected to a rod 97 which in turn is connected to a diaphragm in the cylinder 98. Fluid pressure under the control of the operator is admitted to the cylinder and operates upon the diaphragm for setting the brakes.

It will be noted that the wheels are located wholly outside of the bogie frames. The driving mechanism is directly associated with the bogie frame and the wheels are completely outside of the driving mechanism. This enables the wheels to be readily removed and replaced without any disassembling of the parts. Furthermore, with the driving mechanism arranged as described above, with a separate and independent motor connected to the wheels of each bogie, the speed of the motors is governed by the rate of travel along the roadway. Accordingly, when the vehicle is steered for rounding a curve, the motors adjacent the inside of the curve travel slower than the motors adjacent the outside of the curve, because the bogie traveling along the outer track moves a greater distance than the bogie traveling along the inner or shorter radius curve. This insures easy turning and uniform wear on all of the tires.

By the above construction wherein the driving gear shafts are maintained approximately horizontal, the bogies may be swung about their vertical axes, and oscillate about their horizontal axes with the least possible strain on the universal connections and the least possible extension and contraction of the telescoping sections of the driving shafts.

It will be obvious that many changes may be made in the construction described for supporting the bogie frame on the king post. It is essential, however, that the bogie frame shall be capable of turning movement about a vertical axis for steering and also oscillations about a horizontal axis as the wheels pass over the rough terrain. It will be obvious also that many changes may be made in the driving mechanism, but it is essential that the re-action of the driving torque on the wheel spindles shall be transmitted to the king post of the vehicle frame, so that the wheels may be caused to bear on the ground with equal pressure and thus all sliding movement and wear on the tires avoided. The motors have been referred to as hydrocarbon motors. It is understood, however, that electric motors or any other motor suitable for the purpose may be used. It will be obvious likewise that changes in the details of construction may be made without departing from the spirit of the invention as set forth in the appended claims.

Having thus described the invention, what I claim as new and desire to secure by Letters Patent, is—

1. A vehicle comprising a frame having a depending king post, a bogie frame connected to the king post so as to have a vertical movement relative to the frame, a turning movement about a vertical axis and also an oscillating movement about a horizontal axis, an auxiliary frame unit at each end of said bogie frame, a wheel spindle mounted in each auxiliary frame unit, a wheel carried thereby, an actuating means carried by said auxiliary frame unit for driving said wheel, and means whereby the reaction of the actuating torque on the driving spindle is transmitted to the king post on said vehicle frame.

2. A vehicle comprising a frame having a depending king post, a bogie frame connected to the king post so as to have a vertical movement relative to the frame, a turning movement about a vertical axis and also an oscillating movement about a horizontal axis, an auxiliary frame unit at each end of said bogie frame, a wheel spindle mounted in each auxiliary frame unit, a wheel carried thereby, an actuating means carried by said auxiliary frame unit for driving said wheel, said auxiliary frame unit being mounted in said bogie frame so as to move relative to the bogie frame about the axis of the driving spindle, and a link connecting each auxiliary frame unit to the king post whereby the auxiliary frame units are maintained vertical for all oscillating positions of the bogie frame.

3. A vehicle comprising a frame having a depending king post, a sleeve mounted on the king post so as to turn about the axis thereof and move vertically thereon relative to the frame, cushioning means between the sleeve and the king post, a bogie frame attached to said sleeve for oscillations in a vertical plane, a wheel at each end of said bogie frame, a driving means for said wheels including a spindle attached to each wheel, a gear connected to the spindle, a shaft associated with each spindle and connected to the gear for operating the spindle, a motor mounted on the frame, and a shaft having telescoping sections for connecting the shafts for operating the spindles, and a shaft having telescoping sections for connecting one of said spindle operating shafts to the motor.

4. A vehicle comprising a frame having a depending king post, a sleeve mounted on the king post so as to turn about the axis thereof and move vertically thereon relative to the frame, cushioning springs between the sleeve and the king post, a bogie frame attached to said sleeve for oscillations in a vertical plane, a wheel at each end of said bogie frame, a driving means for said wheels including a spindle attached to each wheel, a spiral gear connected to the spindle, a worm shaft associated with each spindle, means for maintaining the driving shafts for the spindles in horizontal position for all oscillating positions of the bogie frame, a shaft having telescoping sections connected by universal joints with the shafts operating the spindles, a motor carried by the frame, and a shaft having telescoping sections connected by universal joints with one of the spindle operating shafts and with the motor.

5. A vehicle comprising a frame having a king post, a sleeve mounted on the king post so as to turn about the axis thereof and move vertically relative to the frame, springs for cushioning the vertical movement of the sleeve on the king post, a gimbal supporting member carried by said sleeve, a bogie frame mounted on said gimbal supporting member for oscillations in a vertical plane, an auxiliary frame unit mounted in each end of said bogie frame for free turning movement about a horizontal axis, a wheel spindle journaled in each auxiliary frame unit, a wheel carried thereby, a spiral gear mounted on said spindle, a worm shaft mounted in said auxiliary frame unit and connected to said spiral gear, a shaft having telescoping sections connected by universal joints with the worm shafts actuating the spindles whereby said wheels may be driven at the same speed, means for rotating said worm shafts, a link connecting each auxiliary frame unit to the sleeve mounted on the king post so that each auxiliary frame unit will be maintained in a substantially fixed position relative to a vertical line through the axis of the wheel spindle, and the reaction of the driving torque of the worm shaft transmitted to the king post.

6. A vehicle comprising a frame having a king post, a sleeve mounted on the king post so as to turn about the axis thereof and move vertically relative to the frame, springs for cushioning the vertical movement of the sleeve on the king post, a gimbal supporting member carried by said sleeve, a bogie frame mounted on said gimbal supporting member for oscillations in a vertical plane, an auxiliary frame unit mounted in each end of said bogie frame for free turning movement about a horizontal axis, a wheel spindle journaled in each auxiliary frame unit, a wheel carried thereby, a spiral gear mounted on said spindle, a worm shaft mounted in said auxiliary frame unit and connected to said spiral gear, a shaft having telescoping sectons connected by universal joints with the worm shafts actuating the spindles whereby said wheels may be driven at the same speed, means for rotating said worm shafts, a link connecting each auxiliary frame unit to the sleeve mounted on the king post so that each auxiliary frame unit will be maintained in a substantially fixed position relative to a vertical line through the axis of the wheel spindle and the reaction of the driving torque of the worm shaft transmitted to the king post, stops carried by the sleeve, and an arm carried by the bogie frame and cooperating with said stops for limiting the oscillating movement of the bogie frame.

7. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with said spindle, thrust bearings carried by the auxiliary frame unit in which said worm shaft is journaled, and a link connecting each auxiliary frame unit with the means for attaching the bogie frame to the king post whereby the reaction torque of the actuating shaft is transmitted to the king post.

8. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with each spiral gear, thrust bearings carried by the auxiliary frame unit in which said worm shaft is journaled, a link connecting each auxiliary frame unit with the means for attaching the bogie frame to the king post whereby the reaction torque of the actuating shaft is transmitted to the king post, said wheel including a hub removably secured to said wheel spindle, and a tire rim carried by the hub adapted to receive a rubber tire.

9. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with said spindle, thrust bearings carried by the auxiliary frame unit in which said worm shaft is journaled, and a link connecting each auxiliary frame unit with the means for attaching the bogie frame to the king post whereby the reaction torque of the actuating shaft is transmitted to the king post, said wheel spindle having a bearing support in said auxiliary frame unit at each side of said spiral gear, and said wheel including a hub removably secured to the driving spindle outside of the bearings therefor.

10. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with said spindle, thrust bearings carried by the auxiliary frame unit in which said worm shaft is journaled, a link connecting each auxiliary frame unit with the means for attaching the bogie frame to the king post whereby the reaction torque of the actuating shaft is transmitted to the king post, a roller bearing for said spindle at the outer end of the supporting sleeve, and a thrust bearing for said spindle at the opposite side of said spiral gear, said wheel including a hub removably secured to the end of the driving spindle adjacent the roller bearing.

11. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with said spindle, thrust bearings carried by the auxiliary frame unit in which said worm shaft is journaled, a link connecting each auxiliary frame unit with the means for attaching the bogie frame to the king post whereby the reaction torque of the actuating shaft is transmitted to the king post, a roller bearing for said spindle at the outer end of the supporting sleeve, and a thrust bearing for said spindle at the opposite side of said spiral gear, said wheel including a hub removably secured to the end of the driving spindle adjacent the roller bearing, said hub having two tire rims carried thereby, each of which is adapted to receive a rubber tire.

12. A vehicle comprising a frame having a depending king post, a bogie frame, means for attaching said bogie frame to the king post whereby said bogie frame may turn about the axis of the king post, oscillate about a horizontal axis and have a vertical movement relative to the frame on the king post, said bogie frame having a bearing sleeve at each end thereof, an auxiliary frame unit mounted in each bearing sleeve, a wheel spindle journaled in each auxiliary frame unit, a wheel mounted on each spindle, a spiral gear carried by said spindle, a worm shaft cooperating with said spindle, thrust bearings carried by the auxiliary frame unit in which said worm shaft is journaled, a link connecting each auxiliary frame unit with the means for attaching the bogie frame to the king post whereby the reaction torque of the actuating shaft is transmitted to the king post, a roller bearing for said spindle at the outer end of the supporting sleeve a thrust bearing for said spindle at the opposite side of said spiral gear, said wheel including a hub removably secured to the end of the driving spindle adjacent the roller bearing, said hub having two tire rims carried thereby, each of which is adapted to receive a rubber tire, and a brake drum carried by the hub with which the braking means supported by the auxiliary frame unit is adapted to cooperate.

13. A vehicle comprising a main frame, a bogie frame connected thereto so as to have a turning movement about a vertical axis, and also an oscillating movement about a horizontal axis, an auxiliary frame unit at each end of said bogie frame, a wheel spindle mounted on each auxiliary frame unit, a wheel carried thereby and means for supporting each auxiliary frame on said bogie frame whereby said auxiliary frames are free to turn independently about the axes of the wheels supported thereon, a horizontally disposed actuating shaft carried by each auxiliary frame unit for driving the wheel associated therewith, means for connecting and driving the shafts, and means for maintaining said shafts in horizontal position during the oscillating movements of said bogie frame.

14. A vehicle comprising a main frame having a depending king post, a bogie supporting means mounted on said king post so as to move vertically thereon and turn about a vertical axis, a bogie frame mounted on said bogie supporting means so as to oscillate about a horizontal axis, an auxiliary frame unit at each end of said bogie frame, a wheel spindle mounted in each auxiliary frame unit, a wheel carried thereby, said auxiliary frame unit being free to turn about the axis of the wheel, an actuating shaft associated with each auxiliary frame unit for driving the wheel carried thereby, means for connecting and driving said shafts, a link pivoted to each auxiliary supporting frame, and means carried by said bogie supporting means to which the inner ends of said links are connected, the connection between the links and the bogie supporting means being disposed substantially the same distance from the axis of the bogie frame as the distance of the connection of the respective links from the axis of the respective auxiliary frames, whereby said auxiliary frames are maintained in a vertical position for all oscillating movements of the bogie frame.

15. A vehicle comprising a frame having a depending king post, a bogie frame connected to the king post so as to have a vertical movement relative to the frame, a turning movement about a vertical axis and also an oscillating movement about a horizontal axis, a wheel spindle mounted at each end of said bogie frame, a wheel carried thereby, an actuating means carried by the bogie frame for driving said wheels, and means whereby the reaction of the actuating torque on the driving spindles is transmitted to the king post on the vehicle frame.

HENRY FORT FLOWERS.